Dec. 4, 1951     J. A. LOGAN ET AL     2,577,255
VALVE STOP FOR HOSE NOZZLES

Filed Dec. 31, 1949     2 SHEETS—SHEET 1

INVENTOR
JOSEPH A. LOGAN AND
EUGENE V. LAVALLEE
BY Chapin + Neal
ATTORNEYS

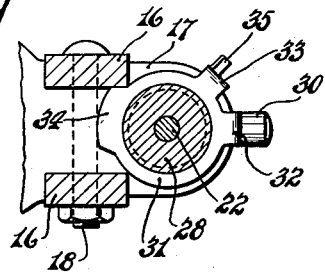
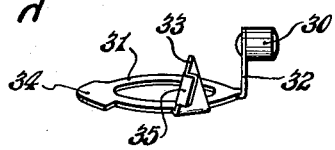
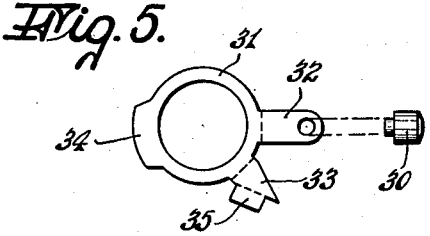
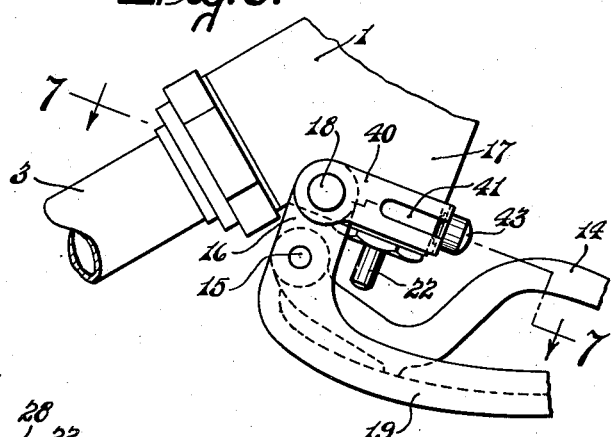
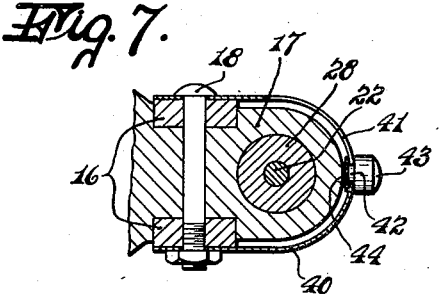

Patented Dec. 4, 1951

2,577,255

UNITED STATES PATENT OFFICE 2,577,255

VALVE STOP FOR HOSE NOZZLES

Joseph A. Logan, Hadley, and Eugene V. Lavallee, South Hadley, Mass., assignors to Gilbert & Barker Manufacturing Company, West Springfield, Mass., a corporation of Massachusetts Application December 31, 1949, Serial No. 136,375

5 Claims. (Cl. 251—153)

This invention relates to improvements in valved hose nozzles such, for example, as are adapted for use with gasoline dispensing pumps at the delivery end of the flexible dispensing hose.

Many automobiles have fuel tanks with fill pipes, which are long and crooked or are otherwise so formed that they cannot conduct gasoline into the tank at the full rate of flow of the dispensing pump. Accordingly, if one attempts to service such tanks at the full and high rate of flow, for which the gasoline dispensing pump is designed, some of the gasoline will be forced outwardly around the spout of the nozzle onto the automobile and the surrounding floor and even into the operator's face.

This invention has for its object the provision of a novel form of stop, which may be manually moved, quickly and easily, whenever required, into the valve-opening path of movement of the valve-actuating hand lever of the hose nozzle, at a position intermediate the ends of such path, in order to limit such movement of the lever and the opening of the nozzle valve, so that a lower rate of flow may be had, with which to safely serve fuel tanks of the class described. Whenever fuel tanks, capable of taking the high rate of flow are to be serviced, the stop may be quickly and easily moved from the aforesaid position to a non-interfering position out of the path of the hand lever.

The invention will be disclosed with reference to illustrative examples in the accompanying drawings, in which—

Fig. 3 is a fragmentary sectional view taken on the line 3—3 of Fig. 1;

Fig. 4 is a perspective view of the stop for limiting the valve-opening movement of the hand lever of the nozzle;

Fig. 5 is a view showing the components of the stop, including a development of the punching from which the stop-bearing disk is made;

Fig. 6 is a fragmentary exterior elevational view of a hose nozzle showing another form of mounting for the hand lever stop; and Fig. 7 is a sectional view taken on the line 7—7 of Fig. 6.

Figure 1:
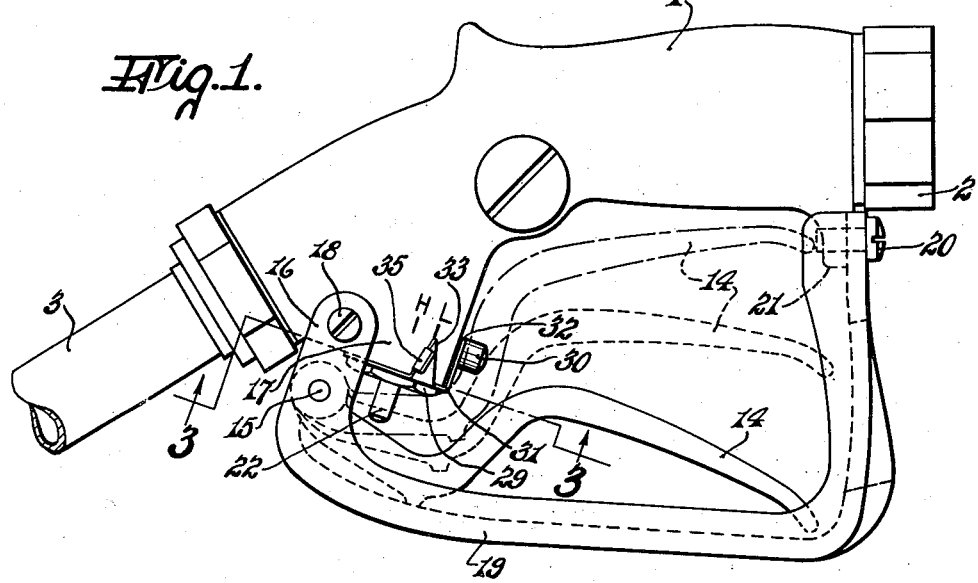
Fig. 1 is an exterior elevational view of a hose nozzle embodying the invention, a portion of the spout being broken away.
Figure 2:
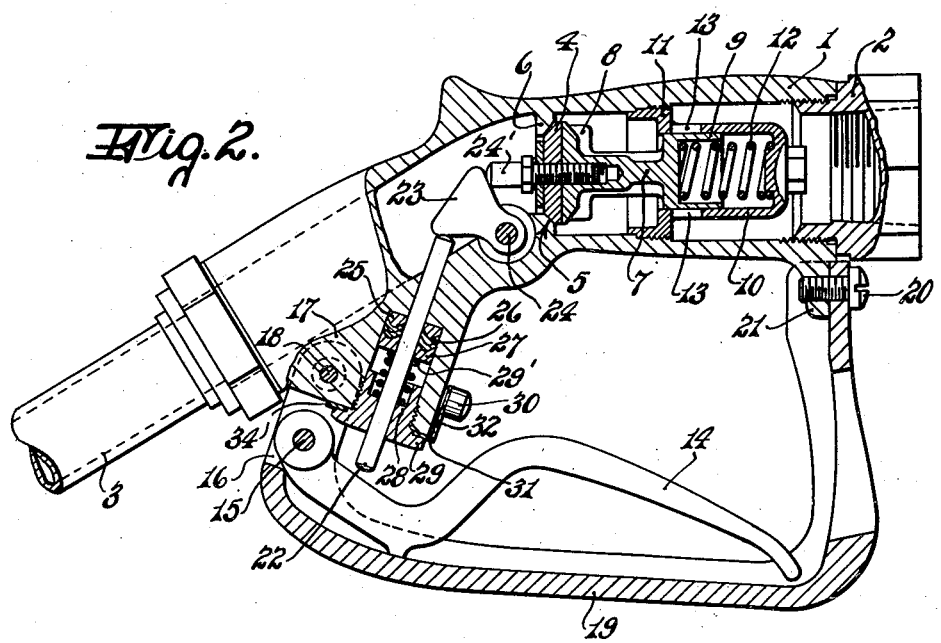
Fig. 2 is a fragmentary sectional elevational view thereof.

Referring to these drawings, there is shown in Figs. 1 and 2 one illustrative example of a hose nozzle, in which the invention may be embodied. This nozzle comprises a hollow body 1, having a bushing 2 at one end, adapted for attachment to the delivery end of the flexible hose of a gasoline dispensing pump, and a tubular delivery spout 3 fixed to its other end. The bushing 2, body 1 and spout 3 afford through them a passage (Fig. 2) for the flow of gasoline from the host to the tank to be serviced. Flow through this passage is controlled by a valve 4 movable toward or away from a seat 5, which is formed around an opening through a transverse partition wall 6 in body 1. Valve 4 has a rearwardly extending stem 7, formed with a plurality of radial vanes 8, spaced circumferentially around the valve and slidably engaging the peripheral wall of the flow passage in body 1 to guide the valve axially toward and away from its seat.

The rear end of stem 7 may have fixed thereon, as shown, a hollow piston 9, which is slidable in a cylinder 10 formed in a bushing 11, threaded into the body 1 and located coaxially of valve 4. A spring 12 in cylinder 10 acts between the closed end of the cylinder and valve 4 to hold the latter on its seat 5. Ports 13 in the peripheral wall of cylinder 10 are controlled by piston 9, being closed by the latter, when valve 4 is closed, and being opened by the piston after valve 4 has moved a short distance away from its seat. The piston helps to support valve 4 for its sliding movement and cooperates with ports 13 as an auxiliary valve in controlling the flow through the nozzle and in relieving valve 4 of some of the hydraulic pressure that tends to move it toward its seat. This piston and cylinder arrangement, while a desirable refinement, are not indispensable parts for the present invention.

The control valve 4, and its piston valve 9 if used, are adapted to be opened against the force of spring 12 by means of a hand lever 14, pivoted at one end on a stud 15, fixed in, and extending between, laterally-spaced side arms 16, the upper ends of which straddle a lower part 17 of body 1 and are secured thereto by a bolt 18. These arms 16 form part of a guard 19 for the lever 14, the other end of this guard being fixed by a screw 20 to a lug 21 depending from body 1. The lever 14 actuates valve 4 through intermediary of a cylindrical stem 22, which is mounted to slide in the part 17 of body 1, and in this case, at an obtuse angle to the axis of valve stem 7. The inner end of this stem 22 is located in the flow passage of the nozzle on the discharge side of partition 6 and engages one side of a rocker arm 23, pivotally mounted at 24. The other side of arm 23 engages an abutment, such as 24', fixed to valve 4. The stem 22 slides through a suitable stuffing box mounted in a recess in the part 17 of body 1, such stuffing box comprising an adapter ring 25, packing rings 26, and a gland ring 27 mounted in the recess in the order named and encircling stem 22. A packing nut 28 having an outer flange 29, in the form of a hexagonal head closes the outer end of the recess and a spring 29' acting between the nut 28 and gland ring 27 compresses the packing 26 between rings 25 and 27.

The nozzle structure, thus far described, is old and well known. The invention is capable of use with many other forms of nozzles differing specifically from the one herein described. The only essentials for the present invention are that the nozzle shall have a valve located inside its body, spring-actuated to closed position, and an actuating stem passing out of the body through a packing nut, with its outer end located in the path of a hand lever by means of which the stem may be moved inwardly to open the nozzle valve.

The present invention provides a stop 30, which may be manually moved about the axis of the valve-actuating stem 22 from one to another of two positions of angular adjustment. In one such position (Fig. 1), the stop 30 lies in the valve-opening path of movement of hand lever 14 and is adapted to arrest it at a location intermediate the ends of such path so as to prevent full opening of valve 4. In the other position, the stop is located out of the path of movement of lever 14 so that full opening of the valve 4 may be obtained. The upper dotted line position of lever 14, shown in Fig. 1, is that for maximum valve opening and full or high flow. The full line position of the lever is that occupied when valve 4 is closed. The intermediate dotted line position is that, wherein the valve 4 is only partly open for low flow.

The stop 30 may conveniently be a stud and its carrier may be formed from a sheet metal punching, such as shown in Fig. 5. This punching comprises a flat thin annular ring 31 of sheet metal with projections 32, 33 and 34 extending radially therefrom. The projection 32 is bent upwardly at right angles to the plane of ring 31 and the stop stud 30 is riveted thereto, as indicated in Fig. 4. The projection 33 is triangular with a lateral extension 35 from one side thereof. Such extension is bent downwardly from the projection 33 and then the latter is bent upwardly into the form shown in Fig. 4. The ring 31 (Fig. 2) encircles the packing nut 28 and is held between the flange 29 and the adjacent end face of the part 17 of the body in which part stem 22 is mounted. The projection 34 (Fig. 3) is located between the spaced side arms 16 of the nozzle guard and serves by abutment with one or the other of these arms to limit the swinging movement of ring 31 about the axis of stem 22. The projection 33 (Fig. 1) forms a pointer and it preferably is bent so as to bear against the periphery of the semi-cylindrical end portion of part 17 in order to frictionally hold the ring in the positions to which it may be moved. The extension 35 serves as a finger piece for moving ring 31. The part 17 of the nozzle may be suitably marked, as by the letters "H" and "L", to indicate by reference to pointer 33 the proper position for ring 31 to locate stop 30 in high flow and low flow positions.

Another mounting for the stop is shown in Figs. 6 and 7. Here, a ribbon 40 of thin steel is wrapped part way around the periphery of body part 17 and its ends are held to the flat sides of such part by the bolt 18. The ribbon has a longitudinally-extending slot 41 therein to receive a cylindrical portion 42 of small diameter of a stop stud 43, the latter having an inner flange 44, riveted to the stud and engaging the inner side of the ribbon 40. The slot 41 limits the movement of the stop stud 43. When this stud abuts one end of slot 41 it is located in low-flow position, as shown. When the stop is moved about 90 degrees to the other end of the slot 41, it is in the high-flow position.

The invention thus provides a simple and inexpensive stop, which can be applied to hose nozzles already in the field as well as new nozzles, and which can be quickly and conveniently moved into the valve-opening path of movement of the hand lever, whenever it is desired to dispense at a low rate of flow and as quickly and easily moved out of such path when full flow is desired.

What is claimed is:

1. In a hose nozzle, of the type wherein a valve, located inside the body of the nozzle and spring pressed to closed position, has an actuating stem passing out of the body through a packing nut with its end located in the path of a hand lever, by which the stem may be moved to open the valve against said spring, a stop, means on the nozzle body for supporting said stop for limited swinging movement about the axis of said stem and confining it against movement in the direction of said axis, said stop being movable between two positions in one of which it is located in the valve-opening path of movement of said lever and is adapted to arrest the lever at a location intermediate the ends of such path of movement and in the other of which it is located out of said path and enables full valve-opening movement of said lever.

2. In a hose nozzle, of the type wherein a valve, located inside the body of the nozzle and spring pressed to closed position, has an actuating stem passing out of the body through a flanged packing nut with its end located in the path of a hand lever, by which the stem may be moved to open the valve against said spring, an annular ring encompassing the packing nut and held in axial position between the flange of the packing nut and the adjacent face of the nozzle body, said ring being free to turn about the axis of said nut and stem and having a projection with a stop fixed thereto and adapted to be carried into and out of the valve-opening path of the valve lever at a location intermediate the ends of such path.

3. In a hose nozzle of the type wherein a valve, located inside the body of the nozzle and spring pressed to closed position, has an actuating stem passing out of the body through a flanged packing nut with its end located in the path of a hand lever, by which the stem may be moved to open the valve against said spring, and a guard for the lever is provided fixed at its ends to the nozzle body and near one end having laterally-spaced arms, an annular ring encompassing the packing nut and held in axial position between the flange of the packing nut and the adjacent face of the nozzle body, said ring being free to turn about the axis of said nut and stem and having a projection with a stop fixed thereto and adapted to be carried into and out of the valve-opening path of the valve lever at a location intermediate the ends of such path, and a projection from said ring extending between said arms and adapted by abutment with one or the other of such arms to limit the angular movement of said ring and stop.

4. In a hose nozzle, of the type wherein a valve, located inside the body of the nozzle and spring pressed to closed position, has an actuating stem passing out of the body through a flanged packing nut with its end located in the path of a hand lever, by which the stem may be moved to open the valve against said spring, an annular ring encompassing the packing nut and held in axial position between the flange of the packing nut and the adjacent face of the nozzle body, said ring being free to turn about the axis of said nut and stem and having a projection with a stop fixed thereto and adapted to be carried into and out of the valve-opening path of the valve lever at a location intermediate the ends of such path, and upward projection from said ring forming a pointer and a finger piece by means of which the ring and stop may be moved from one said position to another, said body having marks thereon to designate the two positions necessary for the pointer to assume to locate the stop in its said two positions.

5. In a hose nozzle, of the type wherein a valve located inside the nozzle body and spring pressed to closed position has an actuating stem passing out of the nozzle body through a part having spaced parallel flat sides interconnected by a semi-cylindrical portion coaxial with said stem, and the outer end of said stem is located in the path of a hand lever by means of which the stem may be moved to open the valve, a thin band extending around said semi-cylindrical portion and fixed at its ends to said sides, said band having a longitudinally extending slot therein, and a stop having a circumferential groove to receive said band and a small cylindrical part to ride in said groove and larger parts located inside and outside said band and defining with said small part said circumferential slot, said stop being movable from one end of the slot in which it is located out of the valve opening path of movement of the lever to the other end of the slot in which it is located in such path at a position between the ends of such path, whereby to limit the valve opening movement of said lever.

JOSEPH A. LOGAN.
EUGENE V. LAVALLEE.

REFERENCES CITED

The following references are of record in the file of this patent:

UNITED STATES PATENTS

| Number | Name | Date |
| --- | --- | --- |
| 612,268 | O'Lally | Oct. 11, 1898 |
| 1,037,139 | Fitzgerald | Aug. 27, 1912 |
| 2,302,306 | Faast | Nov. 17, 1942 |